United States Patent
Asao

[19]

[11] Patent Number: 6,023,119
[45] Date of Patent: Feb. 8, 2000

[54] ALTERNATOR

[75] Inventor: Yoshihito Asao, Tokyo, Japan

[73] Assignee: Mitsubishi Denki Kabushiki Kaisha, Tokyo, Japan

[21] Appl. No.: 09/317,213

[22] Filed: May 24, 1999

[30] Foreign Application Priority Data

Oct. 23, 1998  [JP]  Japan .................................. 10-302559

[51] Int. Cl.⁷ .................................................. H02K 1/00
[52] U.S. Cl. .......................... 310/216; 310/258; 310/259; 310/254; 310/215; 310/187; 310/179
[58] Field of Search ..................................... 310/216, 258, 310/259, 254, 215, 187, 179, 42; 29/596, 598, 605

[56] References Cited

U.S. PATENT DOCUMENTS

| 3,577,851 | 5/1971 | Detheridge et al. ...................... 29/596 |
| 3,842,493 | 10/1974 | Ohuchi et al. ............................. 29/596 |
| 3,886,256 | 5/1975 | Ohuchi et al. ............................ 310/216 |
| 4,116,033 | 9/1978 | Iwaki et al. . |
| 4,613,780 | 9/1986 | Fritzsche ................................. 310/216 |
| 4,747,288 | 5/1988 | Fritzsche ................................. 72/130 |
| 5,786,651 | 7/1998 | Suzuki ................................... 310/259 |

FOREIGN PATENT DOCUMENTS 4-347562  12/1992  Japan .

*Primary Examiner*—Thomas M. Dougherty
*Assistant Examiner*—Thanh Lam
*Attorney, Agent, or Firm*—Sughrue, Mion, Zinn, Macpeak & Seas, PLLC

[57] ABSTRACT

A stator core for an alternator is constructed so as to satisfy the relationships $h/hc<0.2$, and $1.20<hc/bt<1.30$ where $h$ is the depth of recesses formed in the outer circumference of a base opposite teeth, $hc$ is the width of the base, and $bt$ is the width of the teeth.

4 Claims, 9 Drawing Sheets

ALTERNATOR

BACKGROUND OF THE INVENTION

1. Field of the Invention

The present invention relates to an alternator provided with a stator core composed of laminated steel plate having a base and a plurality of teeth projecting radially inwards from the base.

2. Description of the Related Art

FIG. 6 is a cross-section of a conventional automotive alternator, FIG. 7 is perspective view of the stator in FIG. 6, FIG. 8 is a perspective view of the stator core in FIG. 7.

This automotive alternator comprises: a case comprising an aluminum front bracket 1 and an aluminum rear bracket 2; a shaft 6 disposed in the case to one end of which a pulley 4 is secured; a Lundell-type rotor 7 secured to the shaft 6; fans 5 secured to both sides of the rotor 7; a stator 8 secured to the inner wall of the case; slip rings 9 secured to the other end of the shaft 6 for supplying electric current to the rotor 7; a pair of brushes 10 moving in contact with the slip ring 9; brush holders 11 accommodating the brushes 10; a rectifier 12 in electrical contact with the stator 8 for converting the alternating current generated in the stator 8 to a direct current; and a regulator 18 fitted over the brush holder 11 for adjusting the magnitude of the alternating current generated in the stator 8.

The rotor 7 comprises: a rotor coil 13 for generating a magnetic flux when an electric current is passed therethrough; and a pole core 14 disposed so as to cover the rotor coil 13, in which magnetic poles are produced by the magnetic flux generated by the rotor coil 13. The pole core 14 comprises a first pole core assembly 21 and a second pole core assembly 22 which are mutually interlocked. The first pole core assembly 21 and the second pole core assembly 22 are made of iron, and have claw-shaped magnetic poles 23, 24, respectively.

The stator 8 comprises: a stator core 15 through which a rotating magnetic field generated by the rotor 7 passes; and a stator coil 16 being a conductor wound around the stator core 15 through which a generated electric current flows.

The stator core 15 is produced by laminating a punched strip of steel plate having a plurality of teeth spaced equidistantly as the plate is curved into a spiral shape so that the ends of the teeth point towards the center. The stator core 15 comprises a base 30 and a plurality of teeth 31 projecting radially inwards from the base 30. Slots 32 are disposed between adjacent teeth 31 and a winding is wound into the slots 32.

In a vehicle alternator of the above construction, a current is supplied by a battery (not shown) through the brushes 10 and slip rings 9 to the rotor coil 13, whereby a magnetic flux is generated, giving rise to a magnetic field. At the same time, the pulley 4 is driven by the engine and the rotor 7 is rotated by the shaft 6, so that a rotating magnetic field is imparted to the stator core 15 and electromotive force is generated in the stator coil 16.

The magnetic flux A generated in the rotor coil 13, leaves the north-seeking (N) first pole core assembly 21 and enters the teeth 31 of the stator core 15 across an air gap between the rotor 7 and the stator 8. The magnetic flux A then passes through the base 30 and flows back across the air gap from adjacent teeth 31 to the south-seeking (S) second pole core assembly 22. The amount of magnetic flux, which determines the output of the alternator, depends on the magnetomotive force of the rotating magnetic field generated by the rotor 7 and the electromagnetic resistance of the electromagnetic circuit formed by the magnetic flux A. Consequently, if the magnetomotive force is the same, attaining a shape for the electromagnetic circuit with the smallest electromagnetic resistance possible becomes important.

In an automotive alternator of the above construction, since the magnetic flux A passing through the teeth 31 is diverted to the left and right at the roots of the teeth 31 and passes through the base 30, as shown in FIG. 9, the outer circumference B of the base 30 opposite the teeth 31 is not required for the electromagnetic circuit, and is even less desirable in order to lighten the stator core 15, and as a result, recesses 33 extending in the axial direction are formed in the outer circumference B. Moreover, the recesses 33 function as portions engaged by a jig when curving the strip of steel plate into a spiral.

In an automotive alternator of the above construction, the recesses 33 are formed in the stator core 15 in order to lighten the stator core 15 and to function as engaged portions for the jig, but a problem is that if the recesses exceed a predetermined size, electromagnetic resistance is increased by the constriction of the electromagnetic path reducing the amount of magnetic flux, thereby decreasing the output voltage of the alternator.

Furthermore, the stator core 15 is produced by curving and laminating a strip of steel plate into a spiral, but as shown in FIG. 10, the steel plate comprises a frame 40 and a plurality of tooth segments 41 extending perpendicularly from the frame 40. For that reason, when curving the steel plate, stress is concentrated at locations C joining the inside corner portions of the tooth segments 41 and the groove portions 42 formed on the outside of the frame 40, giving rise to large plastic deformations at the locations C, and so another problem is that the stator core 15 becomes a nonuniform polygon shape with sides formed by the base, leading to deterioration in the roundness of the inner circumference of the stator core 15, making the dimensions of the air gap between the rotor 7 and the stator core 15 nonuniform, whereby the magnetic flux density waveforms arising in the air gap are disrupted and power output decreases.

SUMMARY OF THE INVENTION

The present invention aims to solve the above problems and an object of the present invention is to provide an alternator capable of improving output voltage.

To this end, according to the present invention, there is provided an alternator comprising: a rotor including a rotor coil for generating a magnetic flux when an electric current is passed therethrough and a pole core magnetized by the magnetic flux disposed so as to cover the rotor coil; and a stator including a cylindrical stator core disposed around the outside of the rotor through which a rotating magnetic field generated by the rotor passes and a stator coil being a conductor wound around the stator core, in which an alternating electric current is generated, the stator core being composed of laminated steel plate comprising a base and a plurality of teeth projecting radially inwards from the base, the stator core being constructed so as to satisfy the relationships $$h/hc<0.2, \text{ and } 1.20<hc/bt<1.30$$

where h is the depth of recesses formed in the outer circumference of said base opposite the teeth, hc is the width of the base, and bt is the width of the teeth.

DETAILED DESCRIPTION OF THE PREFERRED EMBODIMENTS

Embodiment 1

Figure 1:
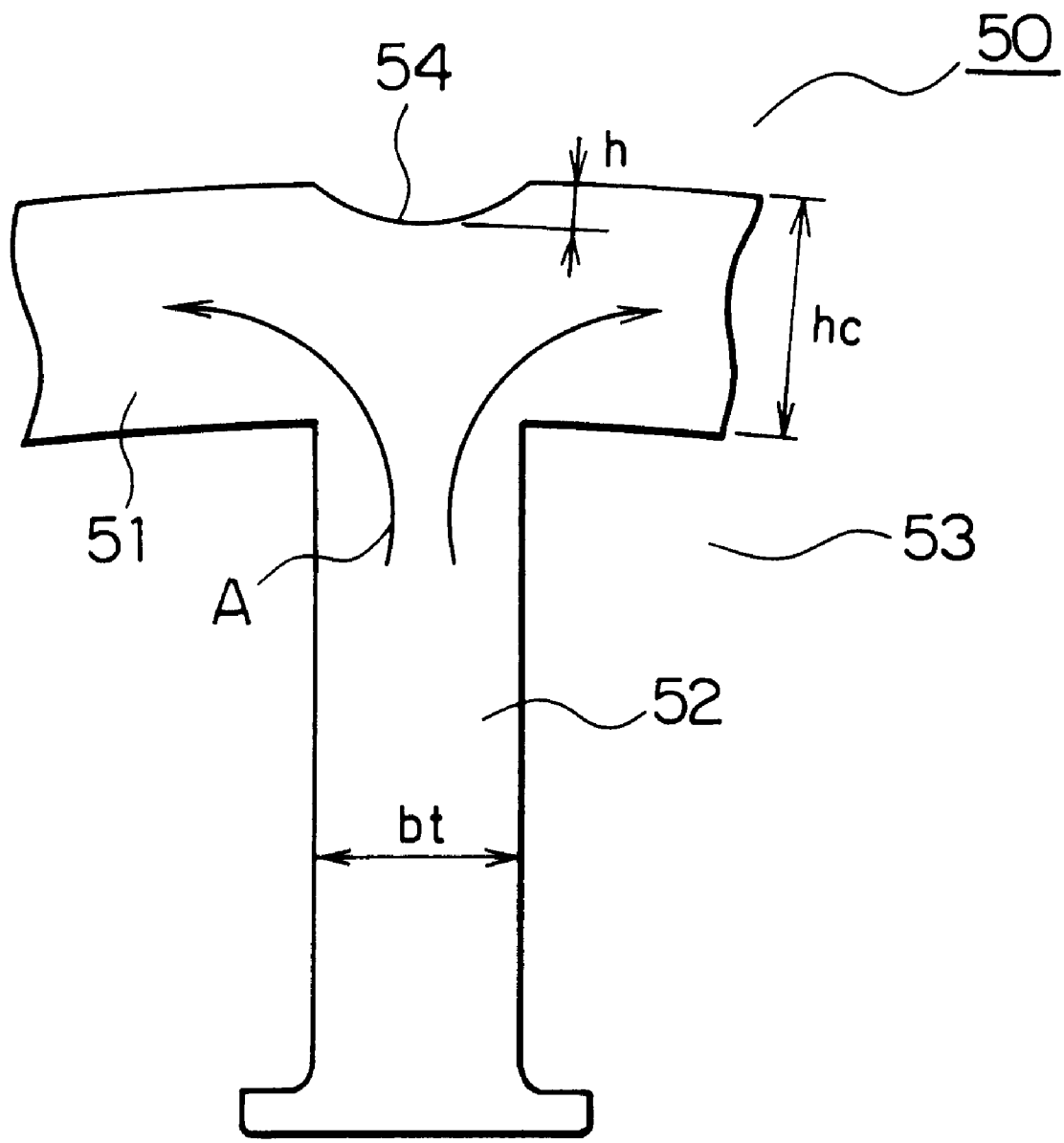
FIG. 1 is a partial plan of an alternator according to Embodiment 1 of the present invention.

FIG. 1 is a partial plan of a stator core 50 for an alternator according to Embodiment 1 of the present invention. Moreover, in the following explanation, portions the same as or corresponding to those in FIGS. 6 to 10 will be explained using the same numerals.

The stator core 50 is produced by laminating a punched strip of steel plate having a plurality of teeth spaced equidistantly as the plate is curved into a spiral shape so that the ends of the teeth point towards the center. The stator core 50 comprises a base 51 and a plurality of teeth 52 projecting radially inwards from the base 51. Recesses 54 are formed on the outer circumference of the base 51 opposite the teeth 52. Slots 53 are disposed between adjacent teeth 52 and a winding is wound into the slots 53.

In this automotive alternator, the magnetic flux A leaving the north-seeking (N) first pole core assembly 21 forms a closed electromagnetic circuit entering the teeth 52 of the stator core 50 across an air gap between the rotor 7 and the stator 8, then passing through the base 51 and flowing back across the air gap from adjacent teeth 52 to the south-seeking (S) second pole core assembly 22. At this time, the amount of magnetic flux A flowing through the electromagnetic circuit, which determines the output of the alternator, depends on the magnetomotive force of the rotating magnetic field generated by the rotor 7 and the electromagnetic resistance of the electromagnetic circuit. That is to say, the magnetomotive force is determined by the product of the magnitude of the electromagnetic resistance and the amount of magnetic flux, and in order to increase the amount of magnetic flux A when the magnetomotive force is the same, the electromagnetic resistance in the electromagnetic circuit must be reduced.

The present inventors have turned their attention to the shape of the stator core 50 in order to reduce the electromagnetic resistance in the electromagnetic circuit. That is to say, in order to determine the most appropriate shape, consideration must be given to the constriction of the magnetic path due to the recesses 54 and to the balance of electromagnetic densities in the teeth 52 and the base 51, and so the inventors concentrated on the ratio (h/hc) of the depth h of the recesses 54 to the width hc of the base 51, and the ratio (hc/bt) of the width hc of the base 51 to the width bt of the teeth 52.

Having chosen the ratios (h/hc), (hc/bt), the amount of magnetic flux was sought by calculation under conditions where the magnetomotive force of the rotor 7 was 1800 AT, the outside diameter of the stator core 50 was 128 mm, the inside diameter of the stator core 50 was 100.2 mm, and the axial length of the stator core 50 was 27 mm.

Figure 2:
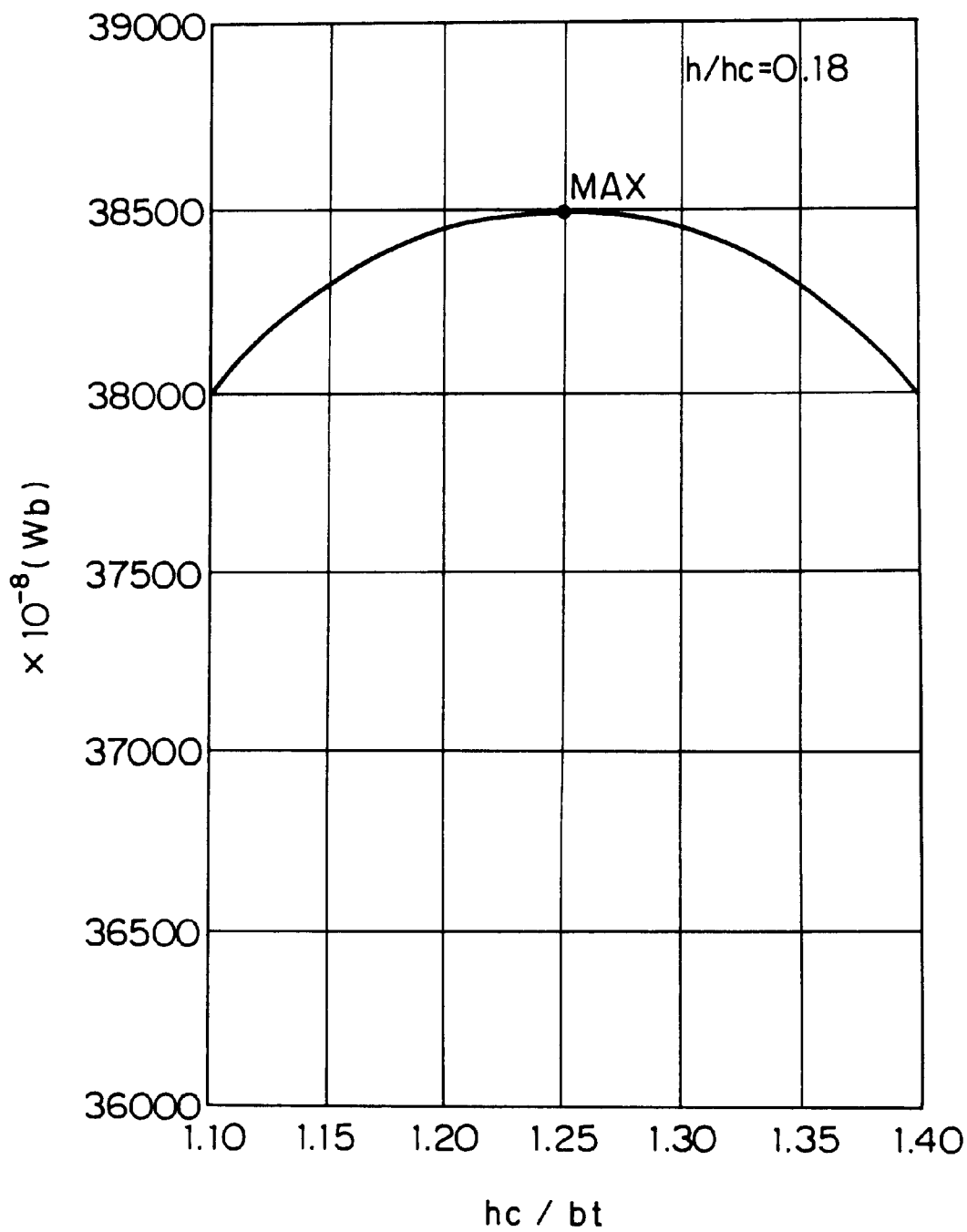
FIG. 2 is a graph showing the relationship between (hc/bt) and magnetic flux in the stator core according to Embodiment 1 of the present invention.

FIG. 2 shows the calculated values for the amount of magnetic flux for various values of (hc/bt) for (h/hc)=0.18 (h=0.8 mm; hc=4.5 mm). From this graph, it is clear that an optimum value for (hc/bt) exists. In this case, the magnetic flux is greatest in the vicinity of (hc/bt)=1.25 (hc=4.5 mm; bt=3.6 mm), the value being $38500 \times 10^{-8}$ Wb.

Figure 3:
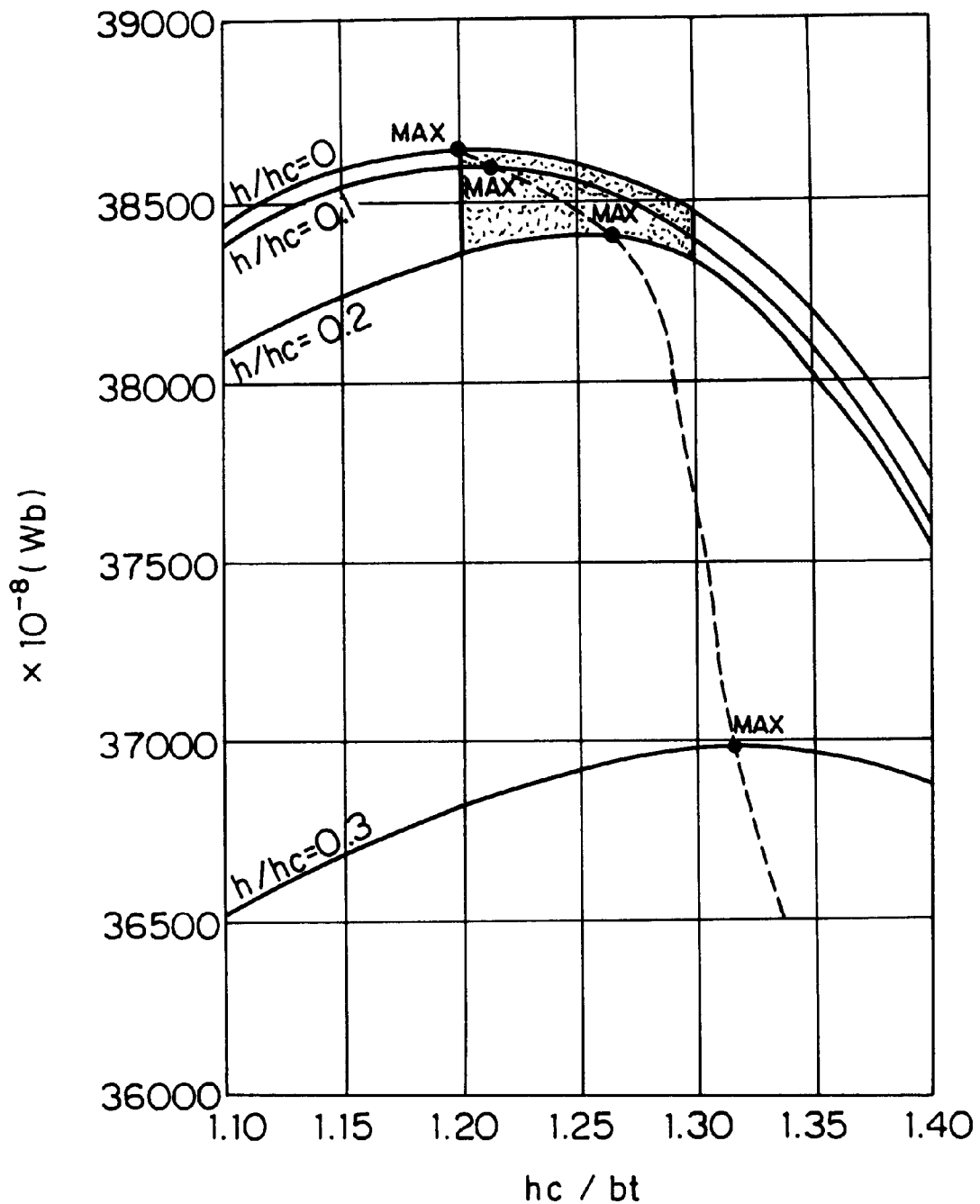
FIG. 3 is a graph showing the relationship between (hc/bt) and magnetic flux for various values of (h/hc) in the stator core according to Embodiment 1 of the present invention.

In addition, FIG. 3 shows the results of similar calculations for cases where (h/hc)=0, 0.1, 0.2, and 0.3, respectively.

As can be seen from these results, the optimum value for the amount of magnetic flux is in the vicinity of (hc/bt)=1.25, and of course, the smaller (h/hc) becomes, that is the deeper the depth h of the recesses 54, the smaller the amount of magnetic flux becomes. Thus, concentrating on the maximum values for the amount of magnetic flux for each value of (h/hc) (broken line in FIG. 3), in the region where (h/hc)=0.2 or more, the maximum value for the amount of magnetic flux decreases dramatically, and for values of (h/hc)=0.2 or less the maximum value for the amount of magnetic flux does not increase very much. This is considered to be because although the magnetic path travelled by the magnetic flux is wider if (h/hc) is small, in other words, if the recesses are small, the average magnetic path is longer, and beyond a certain reduction in the value of (h/hc) increases in the amount of magnetic flux are small.

Consequently, if a stator core 50 is shaped to conform to the relationships (h/hc)<0.2 and 1.20<(hc/bt)<1.30, the amount of magnetic flux is increased, and an alternator capable of increased output can be provided.

For reference, the amount of magnetic flux was calculated for a conventional stator core having the relationships (h/hc)=0.36 (h=1.5 mm; hc=4.2 mm) and (hc/bt)=1.11 (hc=4.2 mm; bt=3.8 mm), the rest of the construction being the same as that of Embodiment 1, and a value of $36600 \times 10^{-8}$ Wb was obtained.

In the example of Embodiment 1, as explained above, the amount of magnetic flux was $38500 \times 10^{-8}$ Wb for (h/hc)=0.18 (h=0.8 mm; hc=4.5 mm) and (hc/bt)=1.25 (hc=4.5 mm; bt=3.6 mm), representing a 5.2 percent increase in the amount of magnetic flux compared to the conventional example.

Figure 4:
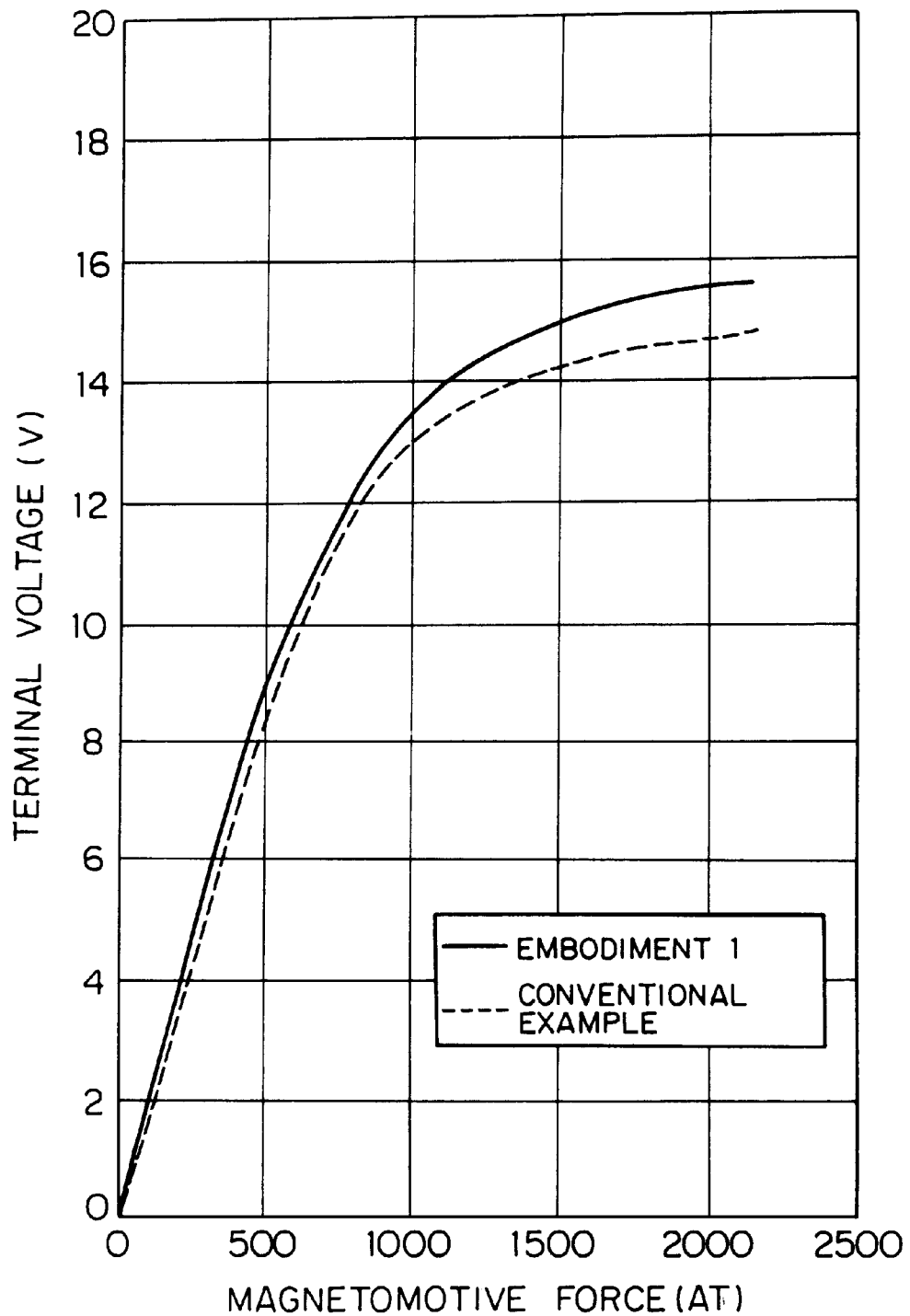
FIG. 4 is a graph showing measurements of the no-load saturation voltage of the alternator according to Embodiment 1 of the present invention.

In order to confirm these results, the no-load terminal voltages of Embodiment 1 and the conventional example were measured with the rotational speed of the rotor 8 of the alternator at 1000 rpm. FIG. 4 shows the measured results thereof. For example, when the magnetomotive force was 1800 AT, the generated voltage was 15.4 V for the example of Embodiment 1 compared with 14.5 V in the case of the conventional example, confirming an approximately 5 percent improvement in generated voltage.

Furthermore, as another example, when the full load was measured with the rotational speed of the rotor 8 at 1300 rpm, the current generated by the alternator was 22.5 A for the example of Embodiment 1 compared with 20 A for the conventional example, confirming an approximately 10 percent improvement in output.

Embodiment 2

Figure 5:
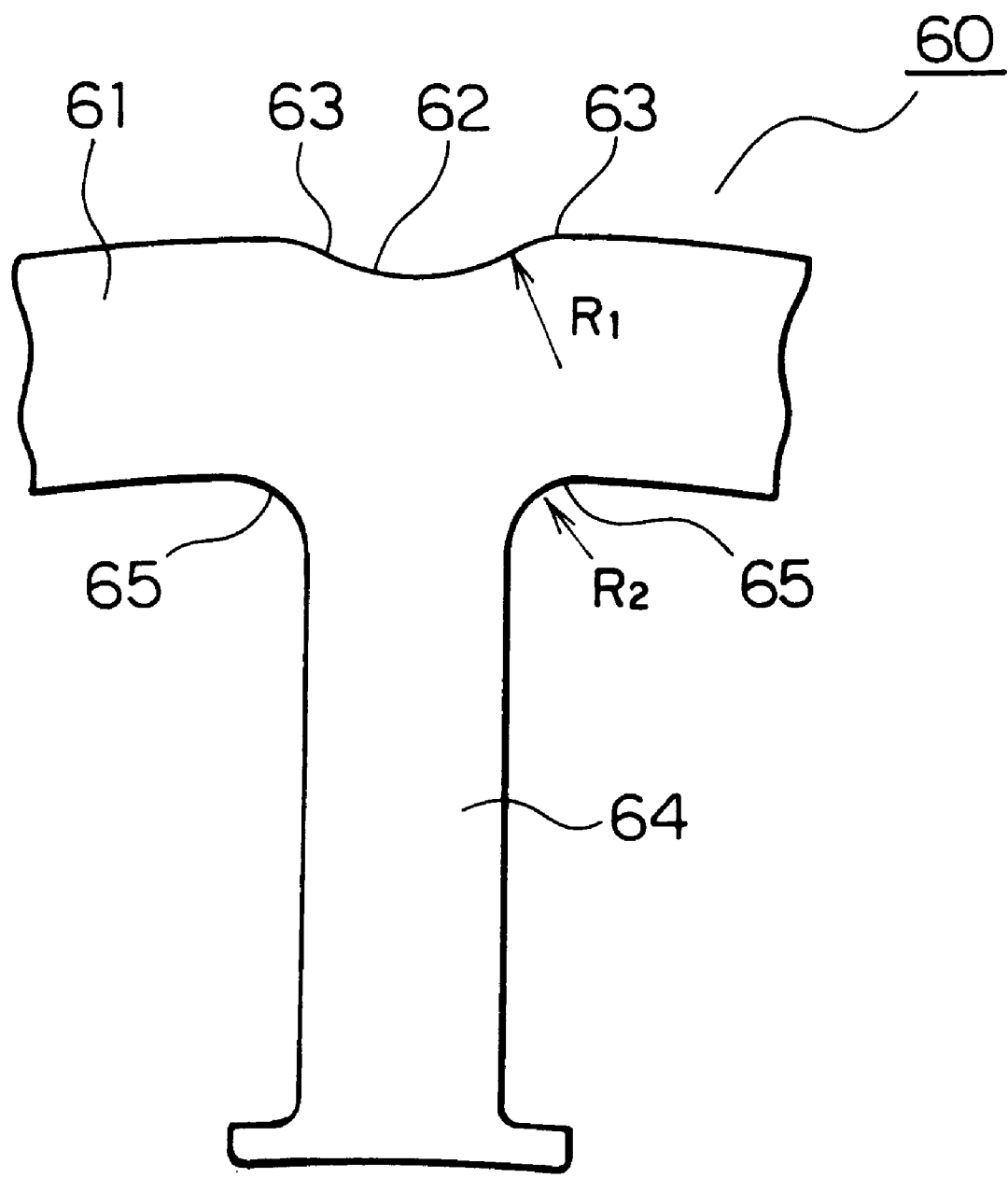
FIG. 5 is a partial plan of an alternator according to Embodiment 2 of the present invention.
Figure 6:
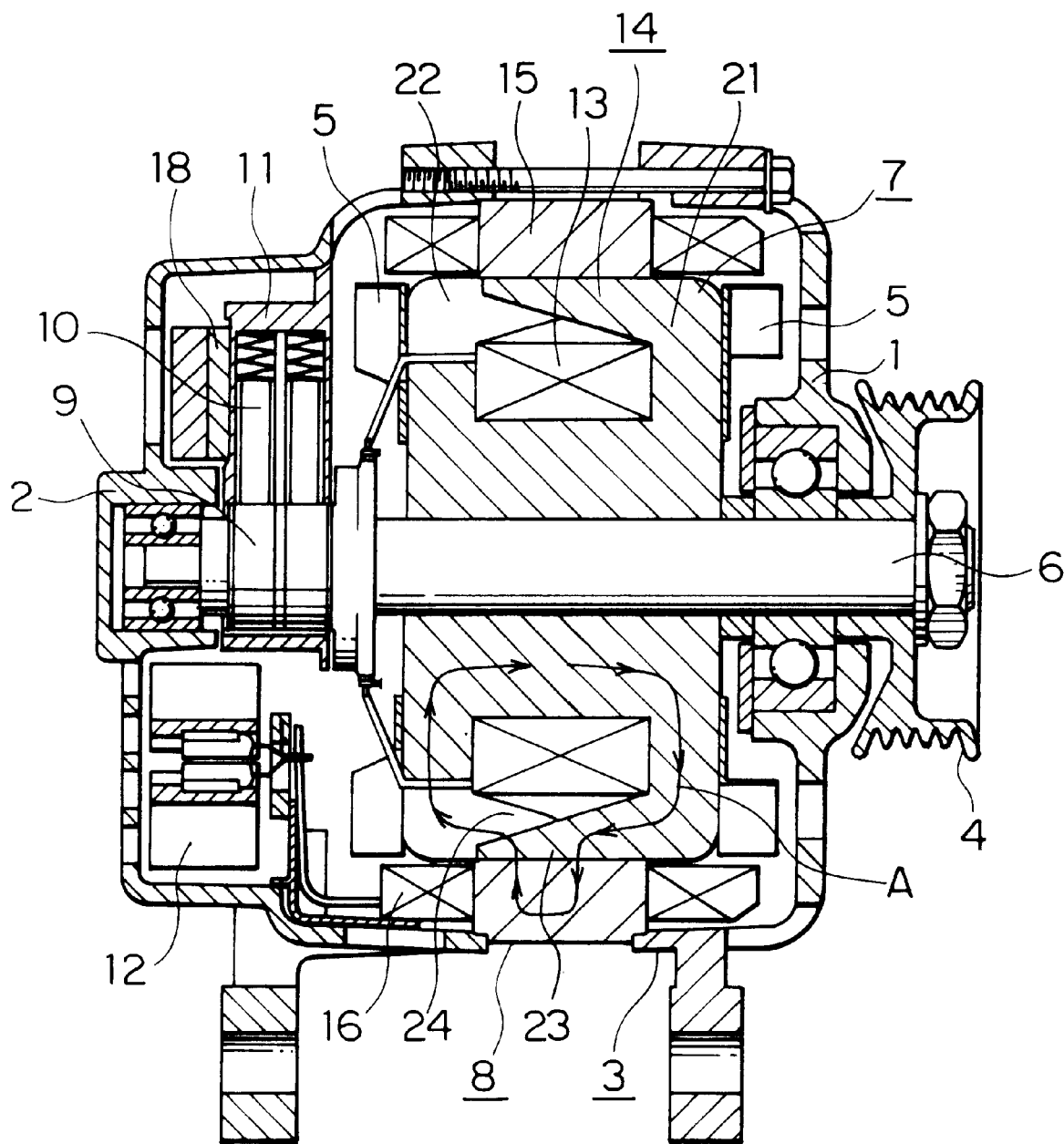
FIG. 6 is a cross-section of a conventional alternator.
Figure 7:
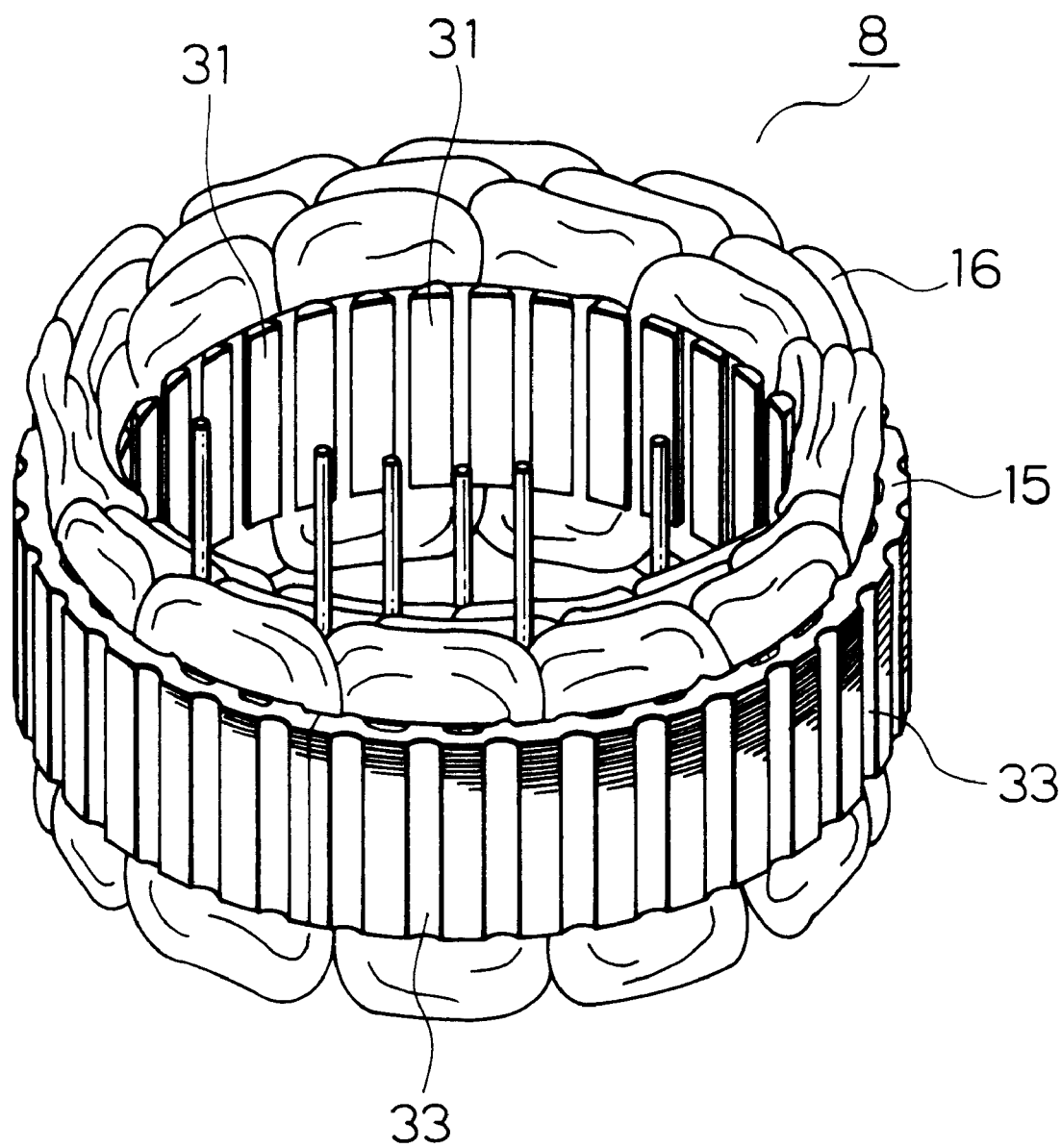
FIG. 7 is a perspective view of the stator in FIG. 6.
Figure 8:
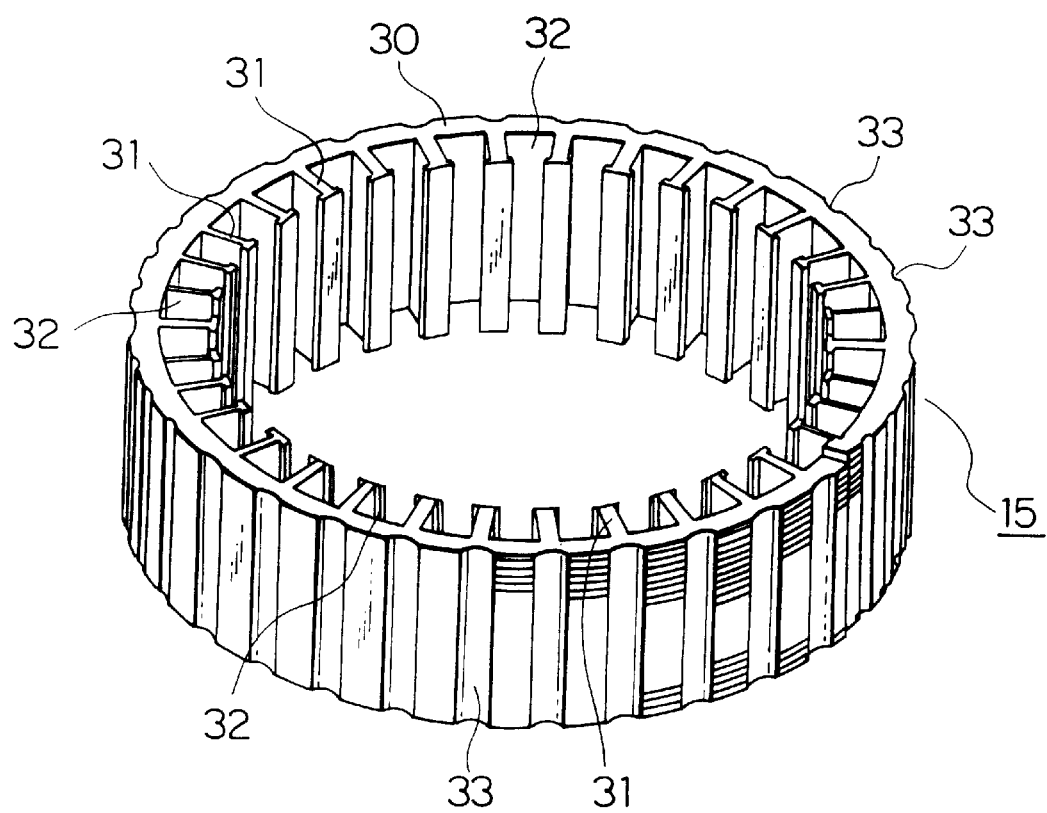
FIG. 8 is a perspective view of the stator core in FIG. 7.
Figure 9:
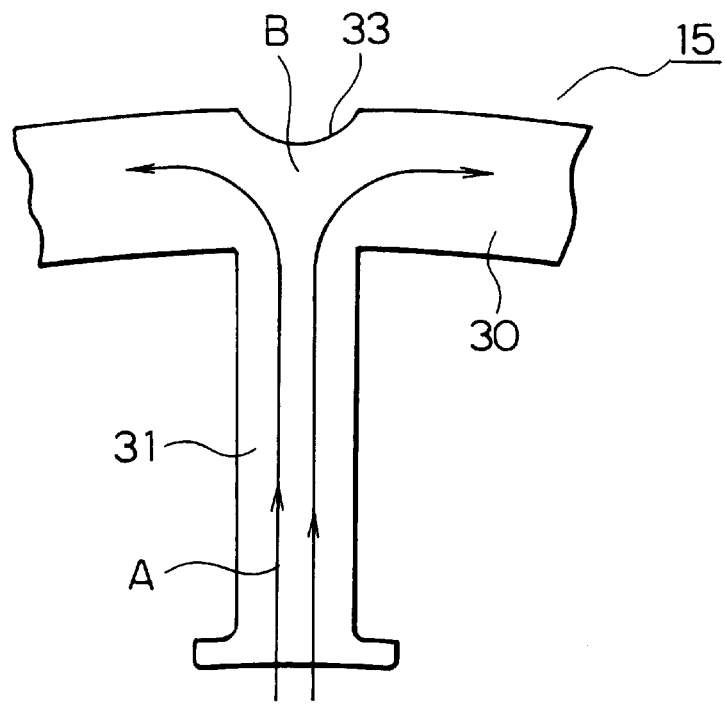
FIG. 9 is a partial plan of FIG. 8.
Figure 10:
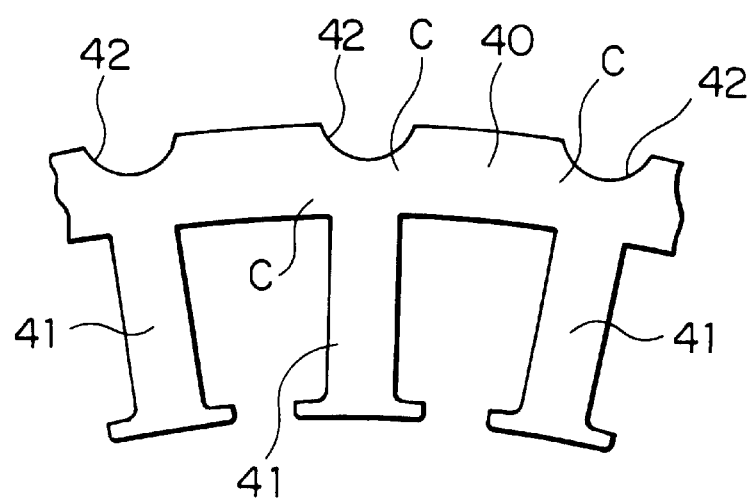
FIG. 10 is a partial plan of the steel plate of the stator in FIG. 6.

FIG. 5 is a partial plan of a stator core 60 according to Embodiment 2 of the present invention.

In this embodiment, curves 63 each having a radius of curvature on the base 61 side thereof are formed on the corners of the recesses 62 formed on the outer circumference of the base 61.

Furthermore, smooth curves 65 are also formed in the corners where the base 61 meets the teeth 64.

Smooth curves are formed in the steel plate composing the stator core 60 in the corners at the root of the tooth segments. Curves each having a radius of curvature on the frame side thereof are formed on the corners of the grooves formed on the frame of the strip of steel plate.

In this embodiment, the strip of steel plate is produced by curving and laminating a strip of steel plate into a spiral, but since curves are formed at the roots of the teeth, concentration of stress on the roots during curving is prevented, improving the roundness of the steel plate after deformation and thereby improving the roundness of the stator core 60.

Furthermore, since curves are also formed on the corners of the grooves, concentration of stress on the corners during curving is prevented, further improving the roundness of the steel plate after deformation and thereby further improving the roundness of the stator core 60.

Since the roundness of the stator core 60 is improved in this manner, the dimensions of the air gap between the rotor 7 and the stator core 60 are uniform throughout, preventing disruption to the magnetic flux density waveforms arising in the air gap.

Moreover, when ten samples each of the stator core 50 of Embodiment 1 and the stator core 60 of Embodiment 2 were made, the difference between the maximum value and the minimum value of the inner diameter was approximately 30 $\mu$m in the stator core 60 compared with approximately 50 $\mu$m in the stator core 50, these experimental results also confirming that the roundness of the stator core 60 is better.

As explained above, an alternator according to one aspect of the present invention comprises: a rotor including a rotor coil for generating a magnetic flux when an electric current is passed therethrough and a pole core magnetized by the magnetic flux disposed so as to cover the rotor coil; and a stator including a cylindrical stator core disposed around the outside of the rotor through which a rotating magnetic field generated by the rotor passes and a stator coil being a conductor wound around the stator core, in which an alternating electric current is generated, the stator core being composed of laminated steel plate comprising a base and a plurality of teeth projecting radially inwards from the base, the stator core being constructed so as to satisfy the relationships $$h/hc<0.2, \text{ and } 1.20<hc/bt<1.30$$

where h is the depth of recesses formed in the outer circumference of said base opposite said teeth, hc is the width of the base, and bt is the width of the teeth. Therefore, electromagnetic resistance is reduced, increasing output.

According to one form of the alternator, the stator core may be constructed by curving and laminating into a spiral a strip of steel plate composed of a frame and a plurality of tooth segments extending perpendicularly from said frame. Therefore, the stator core can be manufactured efficiently.

According to another form of the alternator, curves each having a radius of curvature on the base side may be formed on the corners of the recesses. Therefore, the roundness of the stator produced by curving steel plate is improved, whereby the gap between the rotor and the stator core is made uniform all the way around, thereby increasing output.

According to still another form of the alternator, smooth curves may be formed in the corners where the teeth meet the base. Therefore, the roundness of the stator produced by curving steel plate is improved, whereby the gap between the rotor and the stator core is made uniform all the way around, thereby increasing output.

What is claimed is:

1. An alternator comprising:

a rotor including a rotor coil for generating a magnetic flux when an electric current is passed therethrough and a pole core magnetized by said magnetic flux disposed so as to cover said rotor coil; and a stator including a cylindrical stator core disposed around the outside of said rotor through which a rotating magnetic field generated by said rotor passes and a stator coil being a conductor wound around said stator core, in which an alternating electric current is generated, said stator core being composed of laminated steel plate comprising a base and a plurality of teeth projecting radially inwards from said base, said stator core being constructed so as to satisfy the relationships $$h/hc<0.2,$$

and $$1.20<hc/bt<1.30$$

where h is the depth of recesses formed in the outer circumference of said base opposite said teeth, hc is the width of the base, and bt is the width of the teeth.

2. The alternator according to claim 1 wherein said stator core is constructed by curving and laminating into a spiral a strip of steel plate composed of a frame and a plurality of tooth segments extending perpendicularly from said frame.

3. The alternator according to claim 1 wherein curves each having a radius of curvature on the base side are formed on the corners of said recesses.

4. The alternator according to claim 1 wherein smooth curves are formed in the corners where the teeth meet the base.

* * * * *